US010059487B2

(12) United States Patent
Sun et al.

(10) Patent No.: US 10,059,487 B2
(45) Date of Patent: Aug. 28, 2018

(54) VIBRATION ISOLATION PALLET

(71) Applicant: Solee Science & Technology U.S.A, Berkeley Heights, NJ (US)

(72) Inventors: Lijun Sun, Wuhan (CN); Qin Zhang, Berkeley Heights, NJ (US)

(73) Assignee: Solee Science & Technology U.S.A, Berkeley Heights, NJ (US)

( * ) Notice: Subject to any disclaimer, the term of this patent is extended or adjusted under 35 U.S.C. 154(b) by 0 days.

(21) Appl. No.: 15/824,451

(22) Filed: Nov. 28, 2017

(65) Prior Publication Data

US 2018/0170614 A1  Jun. 21, 2018

(30) Foreign Application Priority Data

Sep. 30, 2016  (CN) .......................... 2016 1 0867510

(51) Int. Cl.
| | |
|---|---|
| *B65D 19/38* | (2006.01) |
| *B65D 19/00* | (2006.01) |
| *F16F 1/374* | (2006.01) |
| *F16F 15/08* | (2006.01) |

(52) U.S. Cl.
CPC ......... *B65D 19/38* (2013.01); *B65D 19/0012* (2013.01); *F16F 1/374* (2013.01); *F16F 15/08* (2013.01)

(58) Field of Classification Search
CPC ................................. B65D 19/38; F16F 15/00
USPC ........... 108/57.12, 51.11; 248/560, 562, 565, 248/638
See application file for complete search history.

(56) References Cited

U.S. PATENT DOCUMENTS

| | | | | | |
|---|---|---|---|---|---|
| 3,276,530 | A | * | 10/1966 | Borneman | B60V 3/025 108/57.12 |
| 3,351,027 | A | * | 11/1967 | Ellard, Jr. | B65D 19/0028 108/57.12 |
| 3,440,976 | A | * | 4/1969 | Burne | B65D 19/00 108/51.11 |
| 3,622,114 | A | * | 11/1971 | McIntire, Jr. | B65D 19/0002 108/55.5 |
| 3,753,407 | A | * | 8/1973 | Tilseth | B65D 19/44 108/53.3 |
| 5,970,886 | A | * | 10/1999 | Knio | B65D 19/38 108/57.12 |
| 6,418,862 | B1 | * | 7/2002 | Heil | B65D 19/0028 108/57.12 |
| 7,637,219 | B2 | * | 12/2009 | Hartel | B65D 19/0012 108/51.11 |

(Continued)

FOREIGN PATENT DOCUMENTS

| | | |
|---|---|---|
| JP | 2008-239170 A | 10/2008 |
| JP | 2008-308233 A | 12/2008 |

*Primary Examiner* — Jose V Chen
(74) *Attorney, Agent, or Firm* — Jeanette Meng Nakagawa

(57) ABSTRACT

The present disclosure is directed to a vibration isolation pallet, comprising a support platform and a vibration isolation component arranged on top. The vibration isolation component further comprises a top and a bottom supporting plate with a plurality of spherical dampers and support columns strategically disposed in between. The edges of the top and bottom supporting plates are reinforced together with rubber damping pieces at various locations. The vibration isolation component can be detached from the support platform and functions independently. The pallet as whole can be serviced and maintained for repeated use.

10 Claims, 3 Drawing Sheets

(56) References Cited

U.S. PATENT DOCUMENTS

| | | | | |
|---|---|---|---|---|
| 7,779,765 B2* | 8/2010 | Donnell, Jr. | ....... | B65D 19/0016 |
| | | | | 108/56.1 |
| 7,854,204 B2* | 12/2010 | Dacus | ................... | B29C 70/088 |
| | | | | 108/51.3 |
| 8,720,350 B2* | 5/2014 | Bush | ................. | B65D 19/0073 |
| | | | | 108/57.12 |
| 9,291,234 B1* | 3/2016 | Green | .................... | B65D 19/40 |
| 9,422,083 B1* | 8/2016 | Embleton | .............. | B65D 19/38 |
| 2001/0050035 A1* | 12/2001 | Mahnken | ................. | B64D 1/14 |
| | | | | 108/57.12 |
| 2003/0037710 A1* | 2/2003 | Monson | ............ | B65D 19/0012 |
| | | | | 108/57.12 |
| 2007/0221102 A1* | 9/2007 | Reinhall | ........... | B65D 19/0073 |
| | | | | 108/57.12 |
| 2009/0205999 A1* | 8/2009 | Smith | .................... | B65D 19/40 |
| | | | | 206/597 |
| 2010/0000163 A1* | 1/2010 | Tsai | ................ | E04F 15/02405 |
| | | | | 52/126.6 |
| 2014/0090581 A1* | 4/2014 | Schultz | ................ | F16F 15/067 |
| | | | | 108/57.12 |

\* cited by examiner

VIBRATION ISOLATION PALLET

FIELD OF THE INVENTION

The present disclosure relates to the technical field of transportation, more specifically, it relates to a vibration isolation pallet on top of which goods are secured and transported.

BACKGROUND OF THE INVENTION

With the rapid development of China's economy, the pace of life of people is increasingly fast, and the requirements for the quality of life are increasingly high, which are reflected in all areas of basic necessities, and new requirements of faster, more efficient and higher-quality transportation are provided for the transportation industry. For the transportation of food, fruits, fragile goods, pharmaceuticals and, precision instruments and other research equipment, more attention needs to be paid on the transportation quality. One of the biggest problems during transportation is vibration, due to uneven pavements and other reasons (such as rural roads, speed bumps, damaged roads, sudden braking and turns and the like), which can in turn cause substantial damage to the goods. At present, the common damping method in the domestic transportation market is to add foam, cardboards and other soft materials around transportation trays and the transported articles to reduce and to buffer vibration, or to reduce the vibration impact by using deformation of structures such as wooden racks. These methods cannot realize effective damping and lack complete calculation verification, the articles may generate a resonance phenomenon during the transportation in the case of improper use, thereby increasing the vibration intensity and causing significant damage to the articles; and moreover, the damping materials cannot be recycled for multiple times, and even some can only be used once, resulting in a huge waste of resources.

SUMMARY OF THE INVENTION

The technical problem to be solved in the present disclosure is to provide a vibration isolation pallet in view of the above defects in the prior art. The vibration isolation pallet can effectively reduce the vibration on various directions and reduce the vibration intensity of resonance caused by the vibration so as to protect transported articles from all directions and improve the transportation quality of the articles, the vibration isolation pallet can be repeatedly used and can be serviced and maintained, thereby saving social resources, and the vibration isolation pallet is simple in structure and convenient to use.

The present disclosure adopts the following technical solution to solve the above technical problem:

A vibration isolation pallet comprises a support platform, a vibration isolation component is arranged on an upper end of the support platform, the vibration isolation component comprises an top supporting plate, spherical dampers and a bottom supporting plate, the top supporting plate is arranged above the bottom supporting plate, the spherical dampers are uniformly arranged between the top supporting plate and the bottom supporting plate, upper ends and lower ends of the spherical dampers are respectively connected with the top supporting plate and the bottom supporting plate, a plurality of damping pieces are distributed around the top supporting plate and the bottom supporting plate, and the upper ends and the lower ends of the damping pieces are respectively connected with the top supporting plate and the bottom supporting plate.

According to the technical solution mentioned above, the damping pieces are rubber pieces.

According to the technical solution mentioned above, the damping pieces are uniformly distributed along the circumferential direction of the top supporting plate and the bottom supporting plate.

According to the technical solution mentioned above, a plurality of protection columns are arranged between the top supporting plate and the bottom supporting plate, and the upper ends of the protection columns are connected with the top supporting plate.

According to the technical solution mentioned above, fixing hooks are arranged on both ends of the vibration isolation component.

According to the technical solution mentioned above, both of the top supporting plate and the bottom supporting plate are composite plates.

According to the technical solution mentioned above, each of the top supporting plate and the bottom supporting plate comprises an upper plate, a cellular plate and a lower plate, the upper plate is connected and fixed with the upper end of the cellular plate, and the lower plate is connected and fixed with the lower end of the cellular plate.

According to the technical solution mentioned above, edgings are arranged around the top supporting plate and the bottom supporting plate, and the edges of the top supporting plate and the bottom supporting plate are respectively wrapped by the edgings.

According to the technical solution mentioned above, the tray is a plastic tray.

The present disclosure has the following beneficial effects:

The spherical dampers play a role of vibration isolation and can effectively reduce the vibration intensity of articles, the spherical dampers can deform on various directions and have a circumferential damping function, the damping pieces have a good damping effect, can effectively reduce the system resonance caused by vibration, meanwhile can enhance the damping effect and protect the safety of the transported articles fixed to the tray and damping equipment, and by means of the combination of the spherical dampers and the damping pieces, the vibration on all directions and the vibration intensity of resonance caused by the vibration can be effectively reduced, on the aspect of transportation damping, the vibration isolation pallet can reduce the vibration and collision on multiple directions during the transportation of the articles, thereby protecting the transported articles on all directions and improving the transportation quality of the articles, on the respect of fixing damping, the vibration isolation pallet serves as an equipment base for damping earthquake so as to protect miniature servers, signal stations and other equipment in multi-earthquake zones, the vibration isolation component and the tray can also be disassembled and used separately, thereby being convenient to use, the vibration isolation component can be installed in a vehicle so that the vehicle can serve as a damping vehicle, the vibration isolation pallet can be repeatedly used and can be repaired and maintained, thereby saving social resources, and the vibration isolation pallet is simple in structure and convenient to use.

Labels: 1 vibration isolation component, 2 support platform, 3 top supporting plate, 4 fixing hook, 5 protection column, 6 bolt, 7 spherical damper, 8 rivet, 9 bottom supporting plate, 10 rubber damping piece, 11 edging, 12 lower panel, 13 cellular panel and 14 upper panel.

DETAILED DESCRIPTION OF THE EMBODIMENTS

The present disclosure will be illustrated below in detail in combination with the drawings and embodiments.

Figure 1:
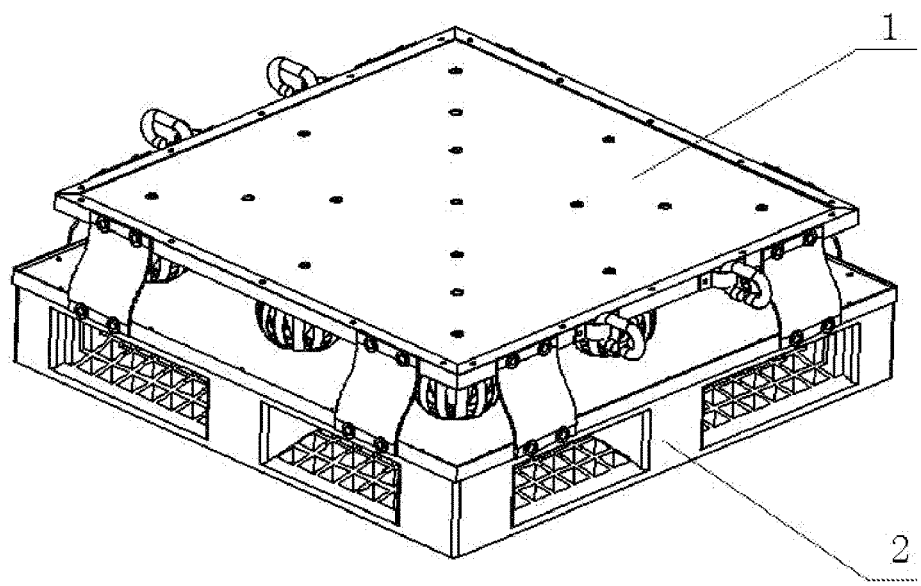
FIG. 1 is a structural schematic diagram of a vibration isolation pallet in an embodiment of the present disclosure.
Figure 2:
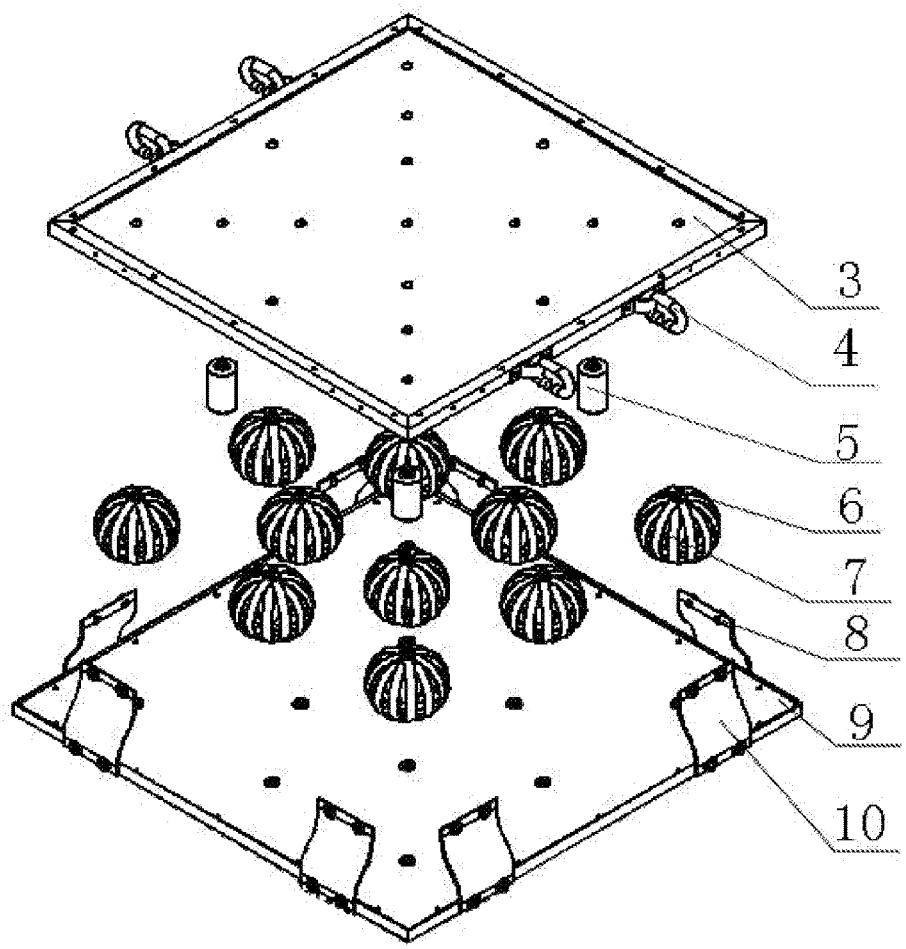
FIG. 2 is an explosive view of a vibration isolation component in an embodiment of the present disclosure.
Figure 3:
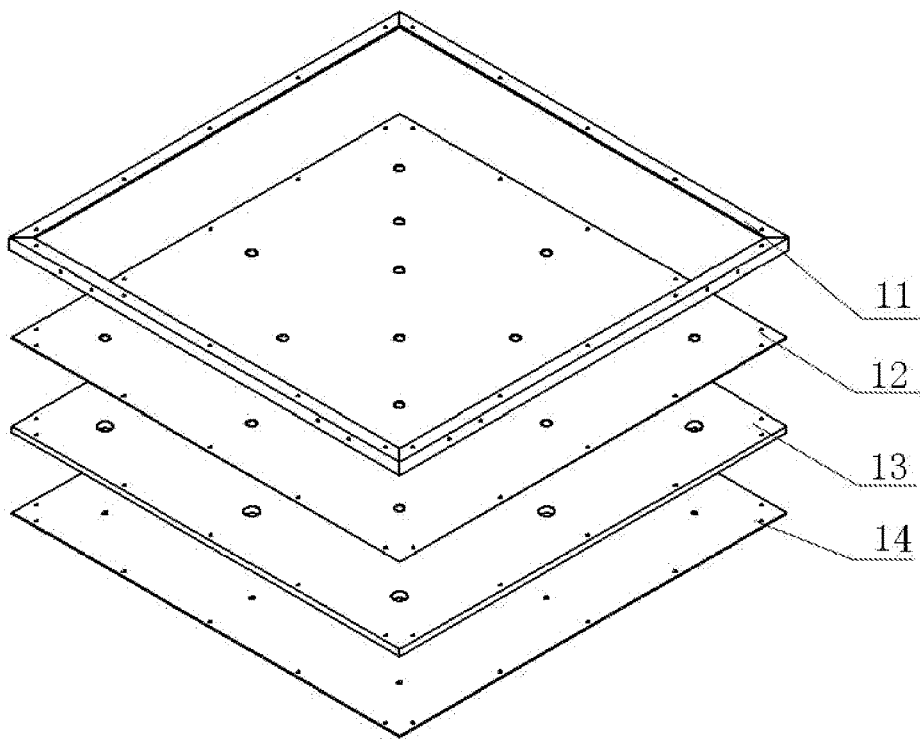
FIG. 3 is a structural schematic diagram of an top supporting plate or a bottom supporting plate in an embodiment of the present disclosure.
Figure 4:
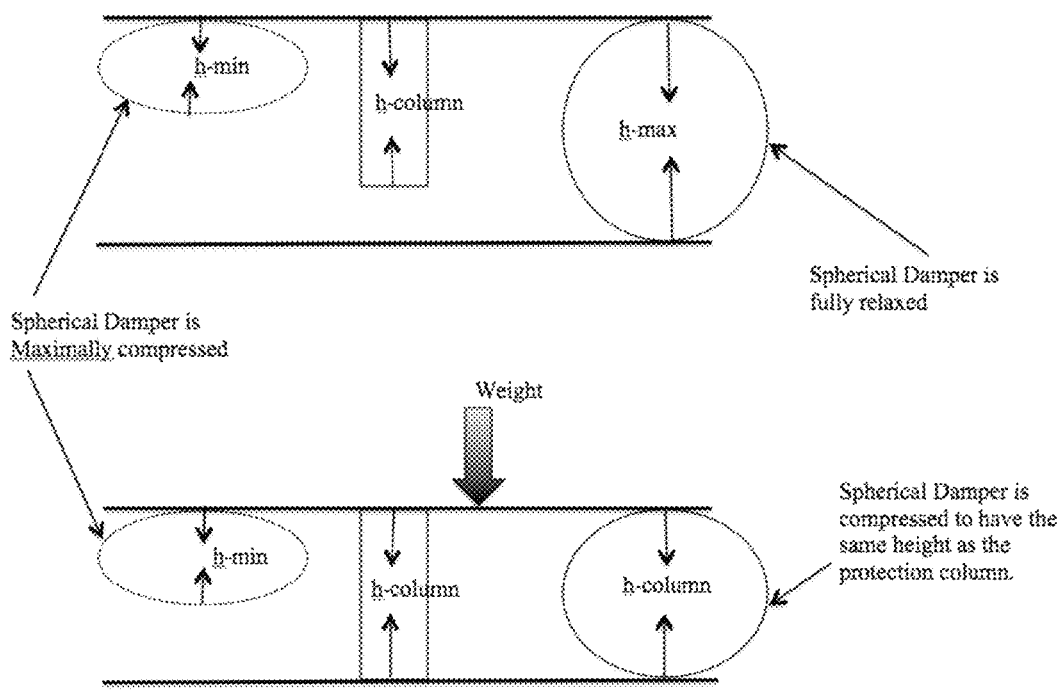
FIG. 4 is a schematic diagram of the column and dampers

As shown in FIG. 1 to FIG. 3, a vibration isolation pallet in one embodiment provided by the present disclosure comprises a support platform, a vibration isolation component is disposed on top of the support platform, the vibration isolation component comprises a top supporting plate, a plurality of spherical dampers and a bottom supporting plate, the top supporting plate is arranged above the bottom supporting plate, the spherical dampers are uniformly disposed between the two plates, top and bottom ends of the spherical dampers are respectively secured with the top supporting plate and the bottom supporting plate, a plurality of rubber damping pieces are distributed around the top supporting plate and the bottom supporting plate, and the ends of the damping rubber pieces are respectively connected with the top supporting plate and the bottom supporting plate; the spherical dampers play a role of vibration isolation and can effectively reduce the vibration intensity of articles, the spherical dampers can deform on various directions and have a circumferential damping function, the damping pieces have a good damping effect, can effectively reduce the system resonance caused by vibration, meanwhile can enhance the damping effect and protect the safety of the transported articles fixed to the tray and damping equipment, and by means of various combination of the spherical dampers and the damping pieces, the vibration on various directions and the vibration intensity of resonance caused by the vibration can be effectively reduced, on the aspect of transportation damping, the vibration isolation pallet can reduce the vibration and collision on multiple directions during the transportation of the articles, thereby protecting the transported articles on all directions and improving the transportation quality of the articles, on the respect of fixing damping, the vibration isolation pallet serves as an equipment base for damping earthquake so as to protect miniature servers, signal stations and other equipment in multi-earthquake zones, the vibration isolation component and the support platform can also be disassembled and used separately, thereby being convenient to use, the vibration isolation component can be installed onto a vehicle so that the vehicle can serve as a damping vehicle, the vibration isolation pallet can be repeatedly used and can be serviced and maintained, thereby saving social resources, and the vibration isolation pallet is simple in structure and is convenient to use.

Further, the damping pieces are rubber pieces.

Further, the rubber damping pieces are uniformly distributed along the circumferential direction of the top supporting plate and the bottom supporting plate.

Further, a plurality of protection columns are arranged between the top supporting plate and the bottom supporting plate, and the upper ends of the protection columns are connected with the top supporting plate; and when the articles on the vibration isolation pallet are overweight, the protection columns can effectively protect the spherical dampers and prevent the spherical dampers from being damaged by overweight.

Further, the heights of the protection columns are greater than those of the spherical dampers when the dampers are maximally compressed, and the heights of the protection columns are less than those of the spherical dampers whey the dampers are in a fully relaxed state.

Further, fixing hooks are arranged on edges of the vibration isolation component; and the fixing hooks are used for securing articles.

Further, the fixing hooks are arranged on edges of the top supporting plate.

Further, each of the top supporting plate and the bottom supporting plate comprises an upper panel, a cellular panel and a lower panel, the upper panel is connected and fixed with the upper surface of the cellular plate, and the lower panel is connected and fixed with the lower surface of the cellular panel.

Further, both of the top supporting plate and the bottom supporting plate are composite plates; and the strength is increased, and the weight is reduced.

Further, edgings are arranged around the top supporting plate and the bottom supporting plate, and the edges of the top supporting plate and the bottom supporting plate are respectively wrapped by the edgings, therefore the articles can be prevented from sliding off during the transportation.

Further, the supporting platform can be plastic.

Further, the spherical damper comprises a plurality of arc-shaped flexible pieces and two bolts, the two bolts are coaxially arranged up and down, the plurality of arc-shaped flexible pieces are distributed on the circumferential direction around the axis where the two bolts are located as the center to form a sphere or a spheroid, and the ends of the arc-shaped flexible pieces are connected with the two bolts respectively.

Further, the spherical damper comprises arc-shaped flexible pieces with equal lengths; the spherical dampers can deform on various directions and have a circumferential damping function; and the positions of the spherical dampers are optimally designed so as to ensure an optimal damping effect of the vibration isolation pallet.

Further, the plurality of arc-shaped flexible pieces are uniformly distributed on the circumferential direction around the axis where the two bolts are located as the center, and the lengths and the bending radians of the plurality of flexible pieces are the same.

Further, the plurality of flexible pieces can be made of metal sheets, which are bent into circular rings or semicircular arcs.

Further, when the flexible pieces are circular ring-shaped; the damper comprises 2-4 identical circular ring-shaped pieces, and are uniformly arranged and are secured together to form a sphere shape.

Further, when the flexible pieces are semicircular arc-shaped, the damper comprises 4-8 identical semicircular arc-shaped flexible pieces that are connected with one another end to end, and the plurality of flexible pieces are uniformly arranged and are enclosed to form a sphere shape.

In one embodiment of the present disclosure, the working principle of the present disclosure is as follows:

The vibration isolation pallet comprises a vibration isolation component and a support platform, and the vibration isolation component and the support platform are connected by bolts and can be separated and used singularly if necessary.

The vibration isolation component comprises a top supporting plate, a plurality of spherical dampers, a bottom supporting plate, a plurality of protection columns, a plurality of rubber damping pieces and a plurality of fixing hooks. The top supporting plate and the bottom supporting plate have the same structure, and the protection columns and the spherical dampers are connected with the top supporting plate and the bottom supporting plate by bolts; and the rubber damping pieces and the fixing hooks are connected with the top supporting plate and the bottom supporting plate by rivets.

The top supporting plate and the bottom supporting plate have the same structure and each comprises of an upper panel, a cellular panel, a lower panel and edgings, and the parts are joined by rivets.

Firstly, the bottom supporting plate is assembled, the lower panel, the cellular panel and the upper panel are laminated in sequence, the edgings are installed, and the lower panel, the cellular panel, the upper panel and the edgings are riveted together; the spherical dampers are installed on the bottom supporting plate and are connected by bolts; then the top supporting plate is assembled according to the assembly method of the bottom supporting plate, the fixing hooks are installed on the top supporting plate and are connected by rivets, the protection columns are installed on the inner surface of the top supporting plate and are connected by bolts, and the top supporting plate and the other ends of the spherical dampers are installed together and are connected by bolts; then the rubber damping pieces are installed around the top supporting plate and the bottom supporting plate, and the two ends of the rubber damping pieces are respectively fixed along the edges of the top supporting plate and the bottom supporting plate and are connected by rivets; and finally, the vibration isolation component is installed onto the support platform and is fastened by bolts, and the vibration isolation pallet can be normally used after being installed.

With respect to the vibration isolation pallet as shown in FIG. 1 to FIG. 3, the vibration isolation pallet is divided into the vibration isolation component 1 and the support platform 2, and the vibration isolation component 1 and the support platform 2 are connected by bolts and can be separated and used singly if necessary.

In summary, the present disclosure provides a transportation tray having a damping function, the vibration isolation pallet is divided into a vibration isolation component and a support platform, which are connected together by bolts; and the vibration isolation pallet not only has all functions of a common tray, but also has a function of reducing the vibration of transported articles, and can be repeatedly used and convenient to maintain. The vibration isolation component and the plastic tray can be used separately, the vibration isolation component can effectively reduce vibration and the vibration intensity during resonance by combining vibration isolation with damping, the vibration isolator is a metal spherical damper, the spherical damper is of a spherical structure that is separately bent by a plurality of flexible pieces with equal lengths, and can effectively reduce the vibration intensity of the articles; the rubber damping pieces is made of rubber having a good damping effect, and thus can effectively reduce system resonance caused by misoperation and protect the safety of the transported articles and the damping equipment in use; the strength of the tray, the stability and fixation of the transported articles, the deformation of a carrying panel of the tray and other factors are considered in the design of the vibration isolation component, optimal design is performed on the installation number and positions of the spherical dampers, thereby reinforcing the overall structural strength of the component; the edgings are designed around the carrying panel of the vibration isolation component to prevent the articles from sliding off during transportation; the fixing hooks used for fixing the articles are arranged on symmetrical edges of the vibration isolation component for bundling the articles; the damping equipment is additionally arranged around the vibration isolation component to enhance the damping effect of the tray; protection equipment is arranged in the vibration isolation component to protect the damper; and the carrying panel of the vibration isolation component adopts a composite plate to increase the strength and reduce the overall weight. The vibration isolation pallet can be provided with different spherical dampers according to different bearing capacities and pavement requirements so as to realize the optimal damping effect. The vibration isolation pallet can effectively reduce the vibration and collision of the articles during transportation and ensure the transportation quality and the transportation safety of the articles during normal work. In addition, the vibration isolation pallet can be repeatedly used for multiple times and can also be maintained, thereby saving the social resources.

The foregoing description is merely a preferred embodiment of the present disclosure, and certainly cannot be used for limiting the scope of the claims of the present disclosure. Therefore, equivalent changes made according to the scope of the present disclosure are still within the protection scope of the present disclosure.

What is claimed is:

1. A vibration isolation pallet comprising a support platform and a vibration isolation component disposed on top, wherein the vibration isolation component further comprising:
   a top supporting plate;
   a bottom supporting plate;
   a plurality of spherical dampers distributed and secured in between the top and bottom supporting plates;
   a plurality of protection columns secured to a bottom panel of the top supporting plate, wherein a height of the protection columns is set to be greater than a height of the spherical damper in its maximally compressed state, and less than a height of the spherical damper in its fully relaxed state; and
   a plurality of damping pieces securing a section of an edge of the top supporting plate to a corresponding section of an edge of the bottom supporting plates at a plurality of locations.

2. A vibration isolation pallet of claim 1, wherein the damping pieces are made of rubber.

3. A vibration isolation pallet of claim 1, wherein the top and the bottom supporting plates further comprising a plurality of hooks secured along their edges.

4. A vibration isolation pallet of claim 1, wherein the top and the bottom supporting plates are composite plates further comprising a top panel, a cellular panel and a bottom panel laminated onto one another in sequence with edging material wrapped around and fastened together.

5. A vibration isolation pallet of claim 1, wherein the spherical damper further comprising four to eight equal length arc-shaped flexible pieces connected at a first end and a second end, forming an axis passing through its center, and the first and second ends are further secured onto the top and the bottom supporting plates.

6. A vibration isolation pallet of claim 1, wherein the spherical damper further comprising two to four equal sized flexible rings connected at corresponding first and second ends forming an axis passing through its center, and the first and second ends are further secured onto the top and the bottom supporting plates.

7. A vibration isolation pallet of claim 1, wherein a number of spherical dampers needed between the top and the bottom supporting plates is determined in proportion to surface area of the two plates.

8. A vibration isolation pallet of claim 1, wherein the spherical dampers are uniformly distributed at locations between the top and the bottom supporting plates.

9. A vibration isolation pallet of claim 1, wherein the support platform is made of plastic.

10. A vibration isolation pallet of claim 1, wherein the vibration isolation component is detached from the support platform and functions independently.

* * * * *